US009631647B2

(12) United States Patent
Schulz et al.

(10) Patent No.: US 9,631,647 B2
(45) Date of Patent: Apr. 25, 2017

(54) SYSTEM FOR IMPROVING THE ENERGY EFFICIENCY IN HYDRAULIC SYSTEMS, PISTON ACCUMULATOR AND PRESSURE ACCUMULATOR PROVIDED FOR SUCH A SYSTEM

(71) Applicant: Hydac Fluidtechnik GmbH, Sulzbach/Saar (DE)

(72) Inventors: Frank Schulz, Blieskastel-Bierbach (DE); Peter Bruck, Althornbach (DE)

(73) Assignee: HYDAC FLUIDTECHNIK GMBH, Sulzbach/Saar (DE)

( * ) Notice: Subject to any disclaimer, the term of this patent is extended or adjusted under 35 U.S.C. 154(b) by 308 days.

(21) Appl. No.: 13/261,904

(22) PCT Filed: Dec. 3, 2012

(86) PCT No.: PCT/EP2012/004974
§ 371 (c)(1),
(2) Date: May 23, 2014

(87) PCT Pub. No.: WO2013/079222
PCT Pub. Date: Jun. 6, 2013

(65) Prior Publication Data
US 2014/0318115 A1      Oct. 30, 2014

(30) Foreign Application Priority Data

Dec. 3, 2011   (DE) .................. 10 2011 120 228

(51) Int. Cl.
*F16D 31/02*      (2006.01)
*F15B 21/14*      (2006.01)
(Continued)

(52) U.S. Cl.
CPC ............ *F15B 21/14* (2013.01); *E02F 9/2217* (2013.01); *F15B 1/024* (2013.01); *F15B 1/24* (2013.01);
(Continued)

(58) Field of Classification Search
CPC ............. F15B 2201/31; F15B 2201/32; F15B 2201/413; F15B 2201/411; F15B 2201/51
(Continued)

(56) References Cited

U.S. PATENT DOCUMENTS 5,971,027 A  * 10/1999  Beachley .................. F15B 3/00
                                                                    138/30
6,145,311 A     11/2000  Cyphelly

FOREIGN PATENT DOCUMENTS

DE       32 47 289 A1    10/1983
DE       601 18 987 T2    1/2007

* cited by examiner

*Primary Examiner* — Thomas E Lazo
*Assistant Examiner* — Daniel Collins
(74) *Attorney, Agent, or Firm* — Wenderoth, Lind & Ponack, L.L.P.

(57) ABSTRACT

A hydraulic system includes an actuator operating as a consumer of hydraulic energy and as a generator of hydraulic energy in different operating states, and includes a hydraulic accumulator (1). In an operating state of the actuator (49), the accumulator can be charged by the actuator for storing energy. In a different operating state, the accumulator can be discharged for delivering energy to the actuator (49). The hydraulic accumulator is an adjustable hydropneumatic piston accumulator having a plurality of pressure chambers (19, 21, 23, 25) adjoining effective surfaces (11, 13, 15, 17) of different sizes on the fluid side of the accumulator piston (5). An adjusting arrangement (51) connects a selected pressure chamber (19, 21, 23, 25) or a plurality of selected pressure chambers (19, 21, 23, 25) of
(Continued)

the piston accumulator (1) to the actuator (49) as a function of the pressure level that prevails on the gas side of the piston accumulator (1) and on the actuator (49).

30 Claims, 6 Drawing Sheets

(51) Int. Cl.
*F15B 1/02* (2006.01)
*F15B 1/24* (2006.01)
*E02F 9/22* (2006.01)

(52) U.S. Cl.
CPC ..... *F15B 2201/205* (2013.01); *F15B 2201/31* (2013.01); *F15B 2201/413* (2013.01); *F15B 2201/51* (2013.01); *F15B 2211/20569* (2013.01); *F15B 2211/212* (2013.01); *F15B 2211/625* (2013.01); *F15B 2211/633* (2013.01); *F15B 2211/6309* (2013.01); *F15B 2211/6336* (2013.01); *F15B 2211/7052* (2013.01); *F15B 2211/88* (2013.01); *Y02E 60/15* (2013.01)

(58) Field of Classification Search
USPC .......................................................... 138/31
See application file for complete search history.

SYSTEM FOR IMPROVING THE ENERGY EFFICIENCY IN HYDRAULIC SYSTEMS, PISTON ACCUMULATOR AND PRESSURE ACCUMULATOR PROVIDED FOR SUCH A SYSTEM

FIELD OF THE INVENTION

The invention relates to a system for improving the energy efficiency in hydraulic systems, having an actuator. In one operating state, the actuator functions as a consumer of hydraulic energy. In another operating state, the actuator functions as a generator of hydraulic energy. A hydraulic accumulator, when in one operating state of the actuator, can be charged by the actuator for the storage of energy. When in another operating state, the accumulator can be discharged for the delivery of energy to the actuator. In addition, the invention relates to a hydropneumatic piston accumulator for use with such a system and a pressure accumulator.

BACKGROUND OF THE INVENTION

Given the increasing scarcity of resources and the increased efforts to save energy associated therewith, systems of the above type are becoming increasingly important. Such systems are used in hydraulic devices and systems for example, in which actuators in the form of working cylinders are provided. The working cylinders generate movements against a load as consumers, or generate energy from load forces for storage in the hydraulic accumulator. For example, in lifting and lowering applications, the potential energy of a lifted load can be converted into hydraulic energy, which may be stored and recycled. Hydraulic hybrid systems for rotary drives are a further field of application. In this case, the actuator has a motor pump unit between a drive motor and a working hydraulics or hydrostatic drive. The motor pump unit functions as a consumer or as a generator of hydraulic energy for storage and recycling in the hydraulic accumulator in corresponding operating states.

Regardless of the application, the efficiency of the energy conversion in the known systems leaves something to be desired. One reason for this efficiency issue is the dependence of the charging and discharging processes of the hydraulic accumulator on the respective system pressure. More specifically, the hydraulic accumulator can still only be charged when the system pressure is greater than the gas pressure found in the accumulator on the gas side. When the system pressure cannot be built up in the respective operating situation of the actuator, energy cannot be acquired in the accumulator. The discharge process of the accumulator is subject to the restriction that energy can only be fed back from the accumulator when the accumulator pressure is still greater than the current system pressure. In addition, there is the problem that in the case of an accumulator pressure that is greater than the currently needed system pressure, the pressure levels of the accumulator and the system must be balanced by valves, so that the energy contained in the differential pressure between the accumulator pressure and the system pressure is lost due to throttling losses.

SUMMARY OF THE INVENTION

In view of these problems, an object of the invention is to provide an improved system of the type under consideration, with a piston accumulator and a pressure accumulator, making a more favorable energy conversion possible.

This object is basically achieved according to the invention by a system having, as an essential feature of the invention, at least one hydraulic accumulator that offers a preferably discontinuous option for adjustment. The accumulator provides a plurality of pressure chambers, which are adjacent to effective surfaces on the fluid side of the accumulator piston having different sizes. An adjustment assembly is provided, which connects a selected pressure chamber or a plurality of selected pressure chambers of the piston accumulator to the actuator as a function of the respective pressure level prevailing on the gas side of the piston accumulator. This selection results in the possibility of recycling energy independent of the pre-charge pressure on the gas side of the accumulator, and independent of the respective load pressure, because the respectively desired pressure level on the accumulator can be used for charging and discharging by selecting an effective surface of suitable size. An optimum energy conversion is thereby possible for all operating conditions.

The use of a "multi-step accumulator" of this kind also opens up the possibility of influencing the load time by selecting the effective surfaces. Selecting a small surface at a constant volume flow results in a short charge time for the accumulator, while selecting a larger surface at a constant volume flow results in a longer charge time. A finer or coarser pressure gradation can be achieved by forming a larger or smaller number of pressure chambers of different effective piston surfaces. More than one accumulator with different pressure chambers may also be provided to achieve an especially high degree of resolution.

In an especially advantageous manner, the adjustment arrangement may be associated with a control logic, which process the signals from sensor devices for the control of the valves associated with the adjustment arrangement. The signals represent the pressure level on the gas side of the piston accumulator and the respective operating state of the actuator. In so doing, the logic controls the energy transformation, in deciding how to charge or discharge the accumulator according to the load at the actuator and the load state at the accumulator. In so doing, the possibility exists that the user may influence the logic with his own requirements, and thereby influence the operating characteristics of the system.

In terms of the design of the piston accumulator, the assembly may be advantageously made in such a way that, for the formation of effective surfaces having different sizes, the accumulator piston is designed as a stepped piston or is step-shaped. Partial piston surfaces are on the fluid side of the accumulator piston that are adjacent to cylinder surfaces. The accumulator housing has corresponding mating surfaces that are adjacent to cylinder surfaces, which mating surfaces, together with the partial piston surfaces associated therewith, each delimit separate pressure chambers.

Effective surfaces on the accumulator piston and mating surfaces on the accumulator housing are preferably disposed in steps or levels that are disposed such that they are spaced axially apart from one another.

At least one of the pressure chambers can be disposed, while also maintaining the axial offset in the interior of the piston. In this respect, a guiding spike for the cylinder is formed, protruding from the cylinder housing. The piston is therefore guided both from outside and from within. The installation height of the piston accumulator is thus shortened and the guidance of the piston substantially improved.

Effective surfaces and mating surfaces may be provided in the form of annular surfaces or circular surfaces, which are concentrically disposed relative to the longitudinal axis.

In terms of the control of the pressure chambers of the piston accumulator, the assembly may be advantageously made in such a way that the adjustment arrangement has switching valves. By those valves, respective pressure chambers of the piston accumulator, which are selected for charging or discharging, can be connected to the actuator, and the remaining pressure chambers can be connected to the tank. Thus, a selected pressure chamber or a combination of selected pressure chambers for charging or discharging can be connected to the actuator by the control logic, while pressure chambers that are not selected can be emptied into the tank without pressure during the discharge, and can be refilled from the tank again during the charging of active pressure chambers.

In terms of the provision of signals of the control logic, the arrangement can be advantageously made such that the assigned sensor device has at least pressure sensors. The pressure sensors provide signals to the control logic, which represent the filling pressure on the gas side of the piston accumulator and the system pressure at the actuator. In addition, the sensor device may have a displacement measuring device, with which the stroke of the accumulator piston may preferably be detected.

The subject matter of the invention also includes a hydropneumatic piston accumulator for a system, as described above. In the accumulator housing, which guides the accumulator piston axial such that it is axially movable, a plurality of pressure chambers are formed. The pressure chambers are adjacent to effective surfaces having different sizes on the fluid side of the piston.

For the formation of effective surfaces having different sizes, the accumulator piston may be designed as a stepped piston or step-shaped, and have partial piston surfaces on the fluid side thereof that are adjacent to cylinder surfaces. The accumulator housing may have corresponding mating surfaces that are adjacent to cylinder surfaces, which mating surfaces, together with the partial piston surfaces associated therewith, each delimit separate pressure chambers.

The effective surfaces on the accumulator piston and the mating surfaces on the accumulator housing may be disposed in steps or levels that are disposed such that they are spaced axially apart from one another.

At least one, preferably at least two, of the pressure chambers may be disposed in the interior of the accumulator piston, while maintaining the axial spacing.

The effective surfaces and the mating surfaces may be provided in the form of annular surfaces or circular surfaces, which are concentrically disposed relative to the longitudinal axis.

A step-shaped bottom part may be provided, wherein the accumulator piston and the bottom part have overlapping wall parts.

All pressure chambers may be separated from one another in a media-tight manner within the accumulator housing.

The pressure chamber disposed in the longitudinal axis of the accumulator housing may be encompassed by a step-shaped part of the accumulator piston, in particular the inner piston thereof. The step-shaped part of the accumulator piston may delimit a further pressure chamber on the outer circumference with a cylinder surface and additional parts of the accumulator piston.

A middle extension of the bottom part, in particular an inner piston, which is designed as a displacement piston, may retract during a relative movement of the accumulator piston and bottom part towards one another in the step-shaped part of the accumulator piston, in particular in the inner piston thereof.

An object of the invention is also basically achieved by a pressure accumulator, in particular designed in the manner of a hydropneumatic piston accumulator, having an accumulator housing, which has a top part and a bottom part at the ends thereof. In the accumulator housing, at least one accumulator piston is disposed such that it is longitudinally displaceable. The piston separates a first media side, in particular a gas side, from a second media side, in particular a fluid side. At least one of the two media sides has pressure chambers that are separated from one another, disposed concentrically relative to a longitudinal axis of the accumulator housing. The respective pressure chambers, which are delimited by the accumulator piston and/or by the housing bottom part, undergo a change in volume, provided that the bottom part retracts into the pressure chambers of the accumulator piston and the accumulator piston retracts into the pressure chambers of the bottom part in a relative movement of the accumulator piston and bottom part towards one another, starting from a maximum position in which at least one of the pressure chambers is maximally filled with a medium, in the direction of a minimum position in which the at least one pressure chamber is comparatively less filled. According to the invention, all pressure chambers are separated from one another in a media-tight manner within the accumulator housing.

The pressure chamber disposed in the longitudinal axis of the accumulator housing may be encompassed by a step-shaped part of the accumulator piston, in particular the inner piston thereof. The step-shaped part of the accumulator piston may delimit a further pressure chamber on the outer circumference with a cylinder surface and additional parts of the accumulator piston.

A middle extension of the bottom part, in particular an inner piston, which is designed as a displacement piston, may retract during a relative movement of the accumulator piston and bottom part towards one another in the step-shaped part of the accumulator piston, in particular in the inner piston thereof.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure.

DETAILED DESCRIPTION OF THE INVENTION

Figure 1:
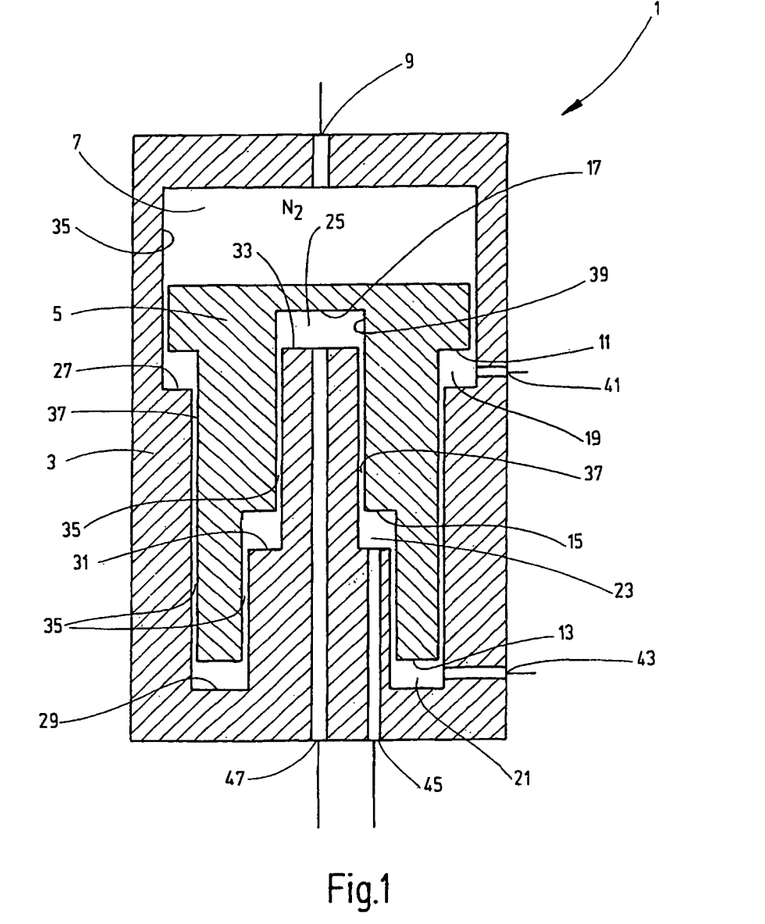
FIG. 1 is a highly schematic, simplified side view in section of a hydropneumatic piston accumulator in a multi-step design according to a first exemplary embodiment of the invention for use in the system according to the invention.

The schematic, simplified illustration of a hydropneumatic piston accumulator 1 shown in FIG. 1 has an accumulator piston 5 that is guided in an accumulator housing 3 such that the accumulator piston 5 is axially movable. The accumulator piston separates a gas side 7 on which a filling connector 9 is located, from pressure chambers on the fluid side in an accumulator housing 3. The accumulator piston 5 is designed in the manner of a stepped piston in such a way that the accumulator piston, in cooperation with correspondingly stepped sections of the of the accumulator housing 3, delimits fluid-side pressure chambers 19, 21, 23 and 25. These chambers are adjacent to effective surfaces having different sizes on the fluid side of the accumulator piston 5. In FIG. 1, these effective surfaces 11, 13, 15 and 17 are arranged in sequence from the smallest surface to the largest surface. The effective surfaces 11, 13 and 15 are thereby each formed by annular surfaces that are concentric relative to the longitudinal axis. The annular surfaces enclose the innermost effective surface 17 in the form of a circular surface. Pressure chambers 19, 21 or 23 respectively, which are adjacent to the effective surfaces 11, 13 and 15, are delimited by mating surfaces 27 or 29 or 31 respectively of the accumulator housing 3, as well as by cylinder surfaces 35 of the cylinder housing 3 and cylinder surfaces 37 on the accumulator piston 5. The pressure chamber 25, which is adjacent to the effective surface 17, is delimited by a mating surface 33 of the accumulator housing 3, as well as by a cylinder surface 39 of the accumulator piston 5.

A fluid connection 41, 43, 45 or 47 respectively is provided for each pressure chamber 19, 21, 23, 25. As the effective surfaces 11, 13, 15 and 17 are disposed on the accumulator piston 5, the associated mating surfaces 27, 29, 31 or 33 respectively are disposed on the accumulator housing 3 in steps that are axially spaced apart from one another.

Figure 2:
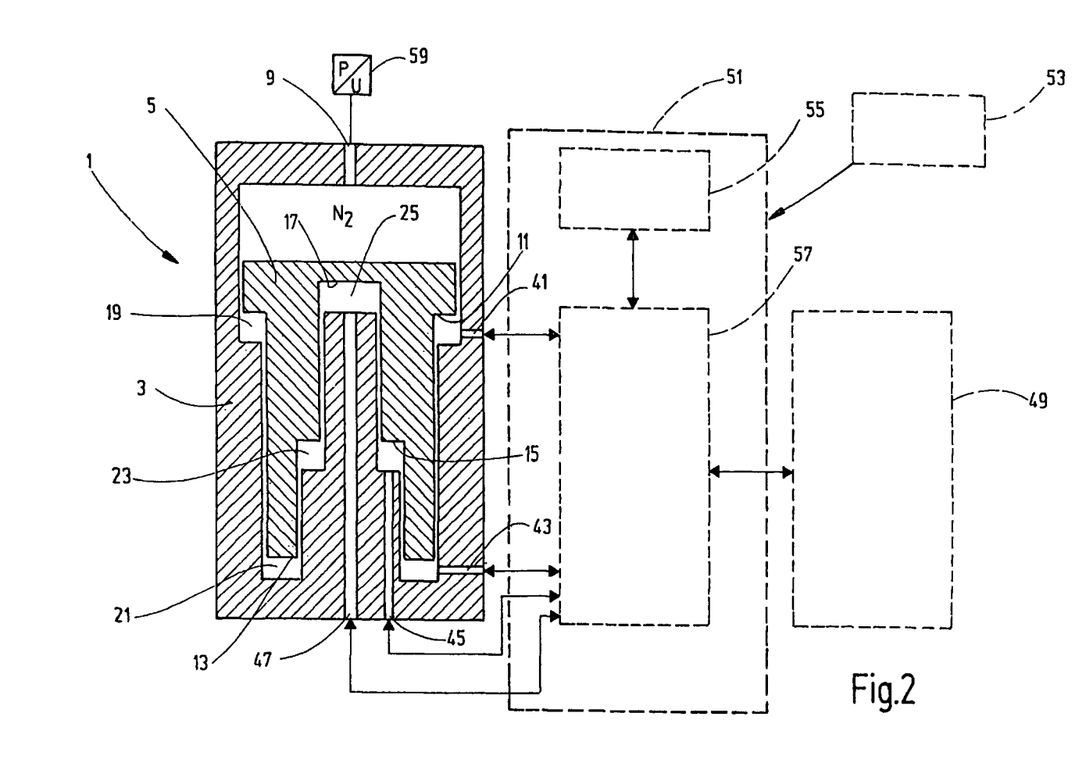
FIG. 2 is a schematic diagram of the piston accumulator of FIG. 1 in conjunction with associated system components of the system according to the invention.

FIG. 2 shows the piston accumulator 1 in conjunction with system components allocated thereto. An actuator 49 is operatively connected to an adjustment arrangement 51. As already noted, the actuator 49 may be a component of a lifting and lowering arrangement for example, or of a hydraulic hybrid systems for rotary drives. A control logic 53 is allocated to the adjustment arrangement 51. The control logic actuates a valve assembly 57 of the adjustment arrangement 51 by a control and regulating unit 55. As is explained in greater detail based on FIGS. 3 to 5, the valve assembly 57 has switching valves, which create selected fluid connections between the actuator 49 and the fluid ports 41, 43, 45, 47 of the piston accumulator 1, to selectively activate the pressure chambers 19, 21, 23 and 25 for charging or discharging processes. To this end, the control logic 53 processes signals, which are provided by sensor devices and which represent the operating conditions of the actuator 49 and piston accumulator 1. Of these sensor devices, only one pressure sensor 59 on the filling connector 9 of the piston accumulator 1 is shown in FIG. 2.

Figure 3:
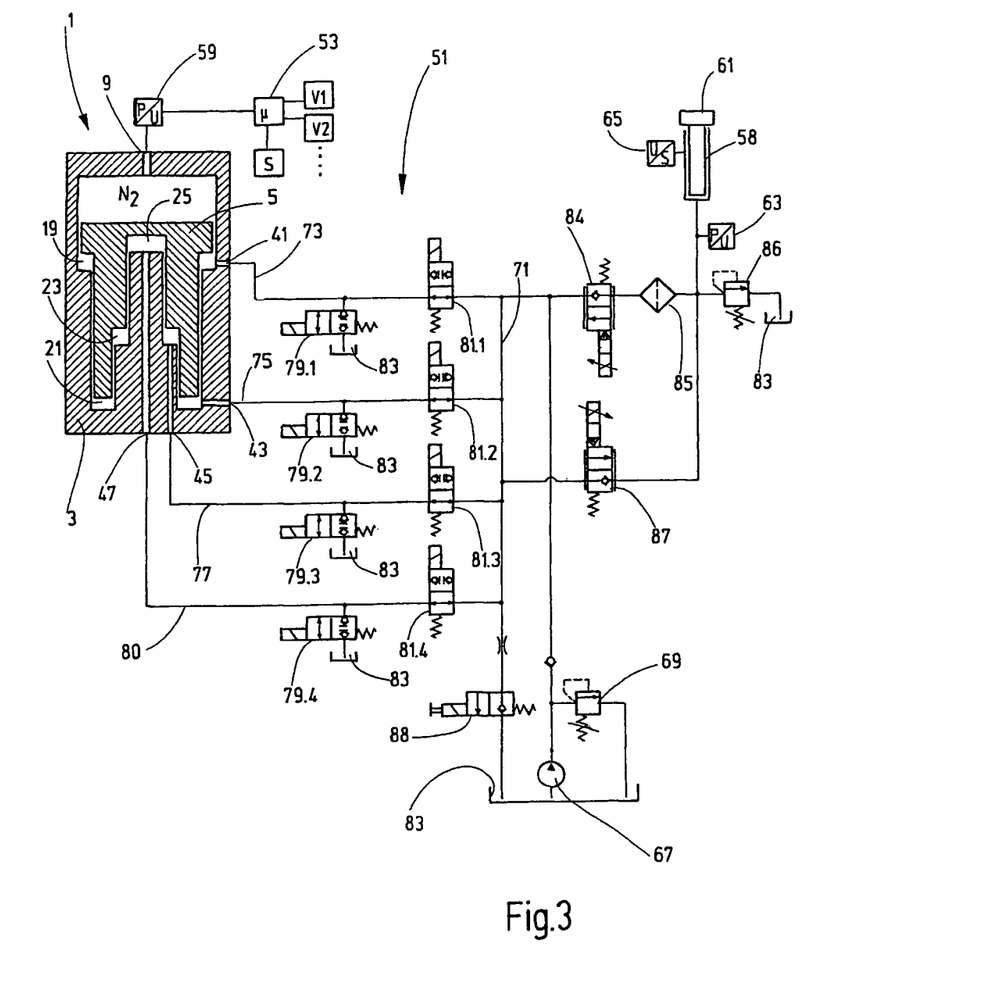
FIG. 3 is a hydraulic circuit diagram with the hydropneumatic piston accumulator of FIG. 1 in a system for a lifting and lowering application according to an exemplary embodiment of the invention.

FIG. 3 shows the system according to the invention in conjunction with a lifting and lowering arrangement. The actuator has a working cylinder 58 for lifting and lowering a load 61. A pressure sensor 63, which detects the load pressure, and a path sensor 65, which detects the lifting and lowering speed, are provided on the working cylinder 58 to generate the signals that are to be processed by the control logic 53. A hydraulic pump 67, safeguarded on the output side by a pressure relief valve 69, is connected to a main line 71 of the adjustment arrangement 51 that controls the system pressure. This pump has a connecting line 73, 75, 77 and 80 for the connection between the main line 71 and each of the fluid ports 41, 43, 45 and 47 of the piston accumulator 1. A valve group, designated by the symbols $v_1$, $v_2$, etc., is located in each of the connecting lines, which valve group can be actuated by the control logic 53. Each valve group comprises two fast-switching 2/2-way valves 79 and 81. In the case of the valve group $v_1$ to $v_4$, the valves are designated with the indices 1 to 4. The associated connecting line can be connected to or blocked on the associated fluid ports of the piston accumulator 1 by the directional valves 81. The respective connecting line 73, 75, 77, 80 can be connected to the tank 83 by the directional valves 79. In addition, each pressure chamber 19, 21, 23, 25 is safeguarded by a pressure relief valve, which is not shown in greater detail.

In the case of a lifting process, the main line 71 can be connected to the working cylinder 58, which is safeguarded by a pressure relief valve 86, by a valve designed as a proportional throttle valve 87 for the control of the lifting speed, as well as by a fluid filter 85. The lifting movement is made with the aid of the energy stored in the piston accumulator by a discharge process from a selected pressure chamber 19, 21, 23, 25 or from a plurality of selected pressure chambers, which have the appropriate pressure level for the lifting movement of the load 61. In the case of the lowering movement, the potential energy of the load 61 is stored as hydraulic energy in the piston accumulator 1. A charging process occurs by an application-dependent proportional throttle valve 84 that adjusts the lowering speed, and by a selected connecting line 73, 75, 77, 80 or by a plurality of selected connecting lines, to a respective fluid port 41, 43, 45, 47. One or a plurality of the directional valves 81 is or are opened respectively. Directional valves 79 in connecting lines that are not selected establish the connection to the tank 83. Through this connection, non-selected pressure chambers 19, 21, 23, 25 of the piston accumulator 1 are unpressurized during the discharging processes, and can be refilled from the tank 83 during recharging processes. A directional valve 88 located on the main line 71 permits depressuring or emptying of the system as needed.

To lower a load with energy recovery, the load pressure on the cylinder 58 is transmitted to the control logic 53 during operation by the pressure sensor 63, and likewise, the gas pressure on the accumulator 1 is detected by the pressure sensor 59. Using this information, the feedback control can decide how the available potential energy of the cylinder 58 can be optimally fed back into the accumulator 1. In the case of low loads, a large effective surface may be selected to charge the accumulator to a high pressure level. If there is a high load 61 on the cylinder 58, the accumulator 1 is charged with a small effective surface. The lowering speed of the load is adjusted by the proportional throttle valve 84.

The load compensation effected by the system may be done discontinuously by selecting and/or switching the suitable effective surfaces. With a sufficiently large number of pressure levels made available in the accumulator 1, the load can be lowered smoothly. In so doing, the throttle valve 84 can smooth out the discontinuity with a pressure compensator. To lift a load 61 in the case of a charged piston accumulator 1, either with or without the aid of the pump 67, the appropriate effective surface, or the appropriate effective surfaces, is or are selected according to the load 61 to the cylinder 58 as a function of the gas pressure in the accumulator 1. To smoothly initiate the movement of the load 61, a smaller pressure level is preferably initially selected. The speed for raising the load 61 is adjusted by the proportional throttle valve 87. The pressure differential is kept as small as possible by the suitable selection of the effective surfaces of the accumulator 1, so that a low-loss conversion of the storage energy is possible during the lifting work.

Figure 4:
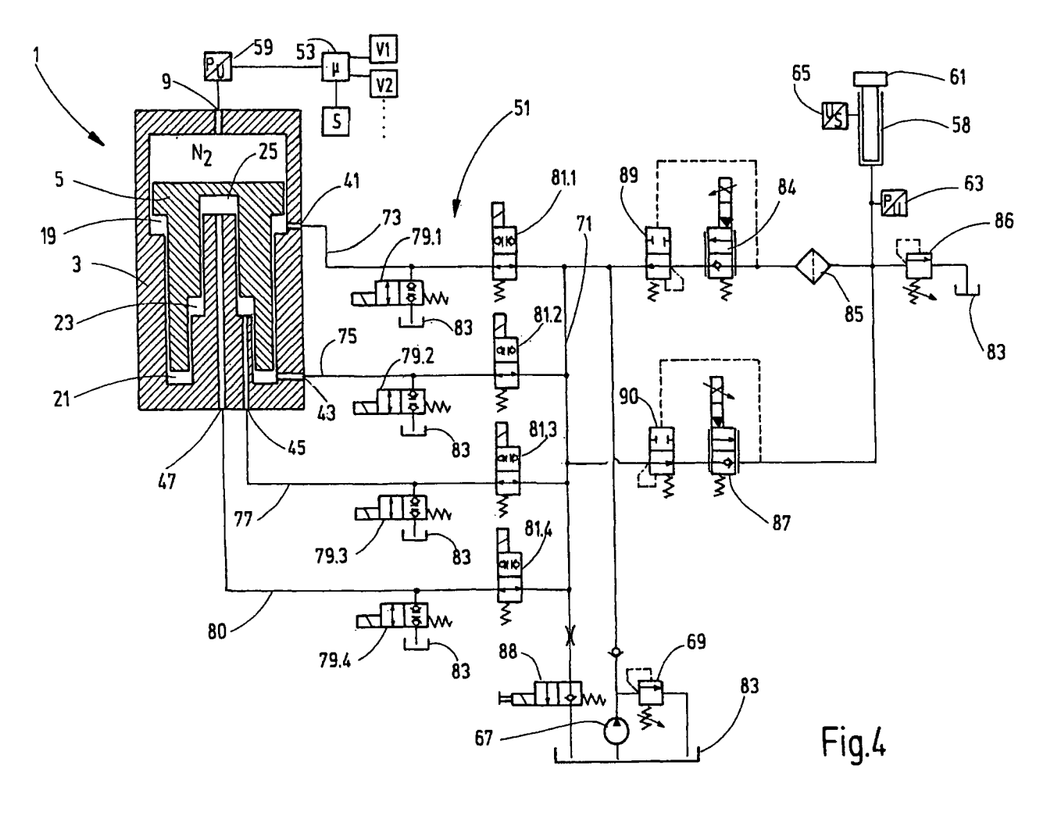
FIG. 4 is a hydraulic circuit diagram with the hydropneumatic piston accumulator of FIG. 1 of a modified exemplary embodiment of the lifting and lowering application according to the invention.

The embodiment in FIG. 4 differs from the example in FIG. 3 only in that a pressure compensator 89 or 90 respectively is provided on each of the proportional throttle valves 84 and 87, to generate a constant pressure differential on the associated proportional throttle valve 84, 87. Jumps to the pressure difference at the respective proportional throttle valve 84, 87 may be compensated for by switching the effective surfaces of the accumulator 1.

Instead of the proportional throttle valves 84, 87, these jumps may also be controlled by pulse-width modulation in the case that fast-switching directional valves 79 and 81 are used. A desired average volume flow can then be adjusted as a function of the impulse modulation or of the pulse duty factor.

Figure 5:
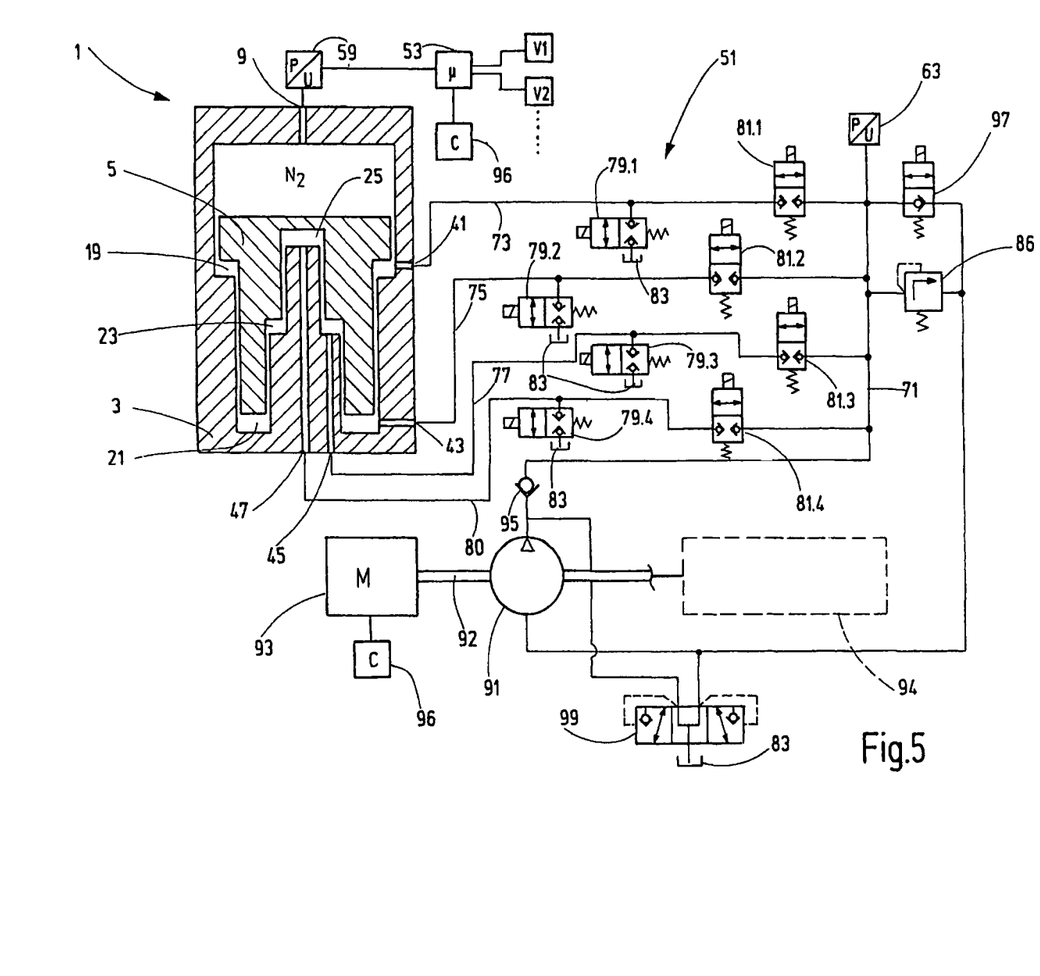
FIG. 5 is a hydraulic circuit diagram, with the hydropneumatic piston accumulator of FIG. 1, in a hydraulic hybrid system for rotatory drives according to an alternative exemplary embodiment of the invention.

FIG. 5 shows the system according to the invention in use in a hydraulic hybrid system for rotary drives. A motor pump unit 91 is provided as an actuator. The pump shaft 92 of motor pump unit 91 is coupled on one side with a drive source, for example, an internal combustion engine 93, and on the other side with a rotary driven device 94. This device may be a working hydraulics, a traction drive or the like, i.e. it may be a device that, in one operating state, functions as a consumer of hydraulic energy and in other operating states, for example during braking of the traction drive, may generate a corresponding torque on the pump shaft 92 as a generator of hydraulic energy. The pressure side of the motor pump unit 91 is connected to a main line 71 of the adjustment arrangement 51 that controls the system pressure by a non-return valve 95. This adjustment arrangement has a connecting line 73, 75, 77, 80 for each connection between the main line 71 and the fluid ports 41, 43, 45 and 47 of the piston accumulator 1. A valve group, designated by the symbols $v_1$, $v_2$ etc., which can be actuated by the control logic 53, is located in each of the connecting lines. Each valve group comprises two fast-switching 2/2-way valves 79 and 81, and in the case of the valve group $v_1$ to $v_4$, are designated with the indices 1 to 4. The respective associated connecting line 73, 75, 77, 80 can be connected to or blocked on the associated fluid port 41, 43, 45 or 47, respectively, of the piston accumulator 1 by the directional valves 81.1 to 81.4. The respective connecting line can be connected to the tank 83 by the directional valves 79.1 to 79.4.

To generate the signals, which are to be processed by the control logic 53, a pressure sensor 59 that detects a pressure level on the gas side is provided on the filling connector 9 of the piston accumulator 1. A pressure sensor 63 detects the system pressure and is provided on the main line 71. A speed sensor 96 is provided on the drive motor 93. Based on these signals, the control logic 53 decides which of the connecting lines 73, 75, 77 or 80 or which combination of these lines will create the connection between the main line 71 and the respectively associated fluid port 41, 43, 45, 47 on the piston accumulator 1. In so doing, a selection is made as to which of the pressure chambers 19, 21, 23, 25, or which combination of these pressure chambers, is best suited for a charging process or discharging process at the respective prevailing pressure level of the system pressure (main line 71) and of the accumulator 1. In the case of the discharging process, the recovered energy is returned to the suction side of the motor pump unit 91 from the main line 71, which is safeguarded by a pressure relief valve 86, by a switching valve 97. In the case of charging processes, the switching valve 97 is closed and a connecting line, or a plurality of the connecting lines 73, 75, 77, 80, is/are activated by the directional valves 81.1 to 81.4. Each of the associated directional valves 79.1 to 79.4 are closed. On the other hand, in the case of each of the non-activated connecting lines 73, 75, 77, 80, the directional valves 79.1 to 79.4 establish the connection to the tank 83, so that the connected, non-selected pressure chambers 19, 21, 23 or 25 of the accumulator 1 are without pressure during discharging processes, and can be refilled from the tank 83 during charging processes. In the case of changing system conditions, the respectively selected combination of the effective surfaces 11, 13, 15, 17 may be changed during the charging processes or discharging processes. An inverse shuttle valve 99 is provided to remove the excess quantity of fluid in the circuit that is discharged from the accumulator 1 during the discharging processes from the now depressurized downstream side of the motor pump unit 91 to the tank 83. In the case of charging processes, the upstream side of the motor pump unit 91 may also be connected to the tank 83 for refilling processes by this shuttle valve.

Figure 6:
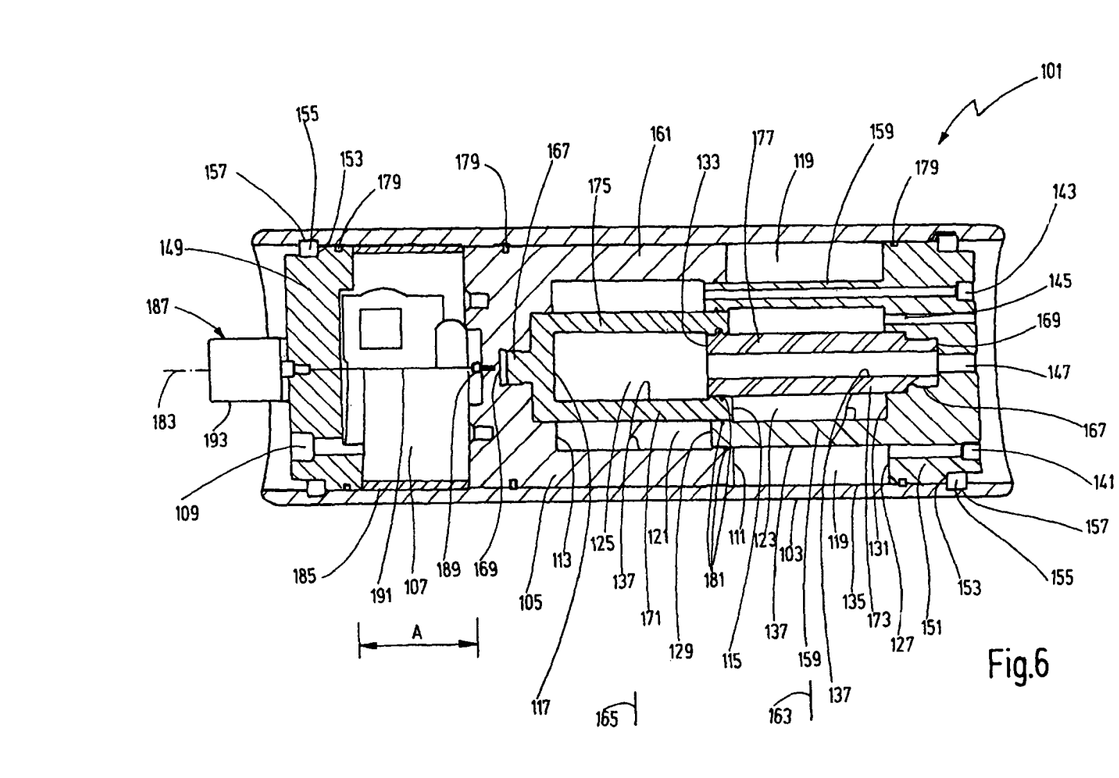
FIG. 6 is a side view in section of a hydropneumatic piston accumulator according to an alternative exemplary embodiment of the invention.

The schematic, simplified illustration of an alternative embodiment of the hydropneumatic piston accumulator 101 shown in FIG. 6 has an accumulator piston 105 guided in a tubular accumulator housing 103 such that the piston can be axially displaced. The accumulator piston 105 separates a gas side 107 from fluid-side pressure chambers 11, 121, 123, 125 in the accumulator housing 103. On the gas side 107, a filling connector 109 in the form of an excentrically disposed bore is located. The accumulator piston 105 is movably disposed between a sleeve-shaped extension 185 of the gas-side top part 149 and a fluid-side bottom part 151. The top part 149 and the bottom part 151 are supported, and to this extent, fixed on projections 153 by snap rings 155 on grooves 157 on the inner circumference of the accumulator housing 103. The bottom part 151 and the accumulator piston 105 are designed such that they are step-shaped and having wall parts 159, 161, wherein the wall parts 159, 161 overlap and two of the pressure chambers 119, 121 are axially held by two notional planes 163, 163 in the longitudinal direction shown in FIG. 6. Both the accumulator piston 105 and also the bottom part 151 have inner pistons 171, 173 that are held by pins 167 in recesses 169. The inner pistons 171, 173 likewise have wall parts 175, 177, which overlap one another and overlap with the wall parts 159, 161 of the accumulator piston 105 and bottom part 151.

Radial seals 179 are provided between the accumulator housing 103 and the top part 149, the accumulator piston 105, and the bottom part 151, respectively. Additional radial seals 181 are disposed between the accumulator piston 105 and the bottom part 151, as well as the inner pistons 171, 173. The pressure chambers 119, 121, 123, 125 are adjacent to effective surfaces having different sizes on the fluid side of the accumulator piston 105 the inner piston 171 thereof, respectively. In FIG. 6, these effective surfaces 111, 113, 115, 117 are arranged from the largest surface to the smallest surface. In so doing, the effective surfaces 111, 113, 115 are each formed by annular surfaces. These annular surfaces are concentrically disposed relative to the longitudinal axis 183, which annular surfaces enclose the innermost effective surface 117 in the form of a circular surface. Pressure chambers 119, 121, 123, which are adjacent to the effective surfaces 111, 113, 115, are delimited by mating surfaces 127, 129, 131 of the bottom part 151 or of the inner piston 173 thereof, as well as by a cylinder surface 135 of the cylinder housing 103 and cylinder surfaces 137 on the accumulator piston 105, the bottom part 151 and the inner piston 171, 173.

The pressure chamber 125, which is adjacent to the effective surface 117, is delimited by a mating surface 133 of the inner piston 177 on the bottom part side, as well as by a cylinder surface 137 of the inner piston 177 on the accumulator piston side. A fluid port 141, 143, 145, 147, in each case in the form of a bore in the bottom part 151, is provided for each pressure chamber 119, 121, 123, 125. Adjacent to the top part 149, a tubular sleeve 185 is used as a stop for the accumulator piston 105 in the accumulator housing 103. The sleeve 185 contacts the accumulator housing 103 on the outside. In addition, a displacement measuring device 187 is provided such that the distance A, from the top part 149 to the accumulator piston 105, may be determined at any time. Moreover, a wire 191 is attached to an eyelet 189 on the accumulator piston 105, which may be extended from a sensor device 193. Moreover, a pressure measuring device, not shown in greater detail, may be integrated within the sleeve 185.

While various embodiments have been chosen to illustrate the invention, it will be understood by those skilled in the art that various changes and modifications can be made therein without departing from the scope of the invention as defined in the claims.

The invention claimed is:

1. A system for improving energy efficiency in hydraulic systems, the system comprising:
   an actuator operable in a consumer operating state thereof as a hydraulic energy consumer and in a generating operating state thereof as a hydraulic energy generator;
   a discontinuously adjustable hydropneumatic piston accumulator being chargeable in a charging state thereof to store energy from said actuator and being dischargeable in a discharging state thereof to deliver the energy to said actuator, said accumulator including an accumulator housing and an accumulator piston separating a gas side and a fluid side in said accumulator housing and including a plurality of pressure chambers adjacent to effective surfaces of different sizes on said fluid side;
   an adjustment arrangement having valves connecting at least a selected one of said pressure chambers or a selected plurality of said pressure chambers to said actuator as a function of the respective pressure levels on said gas side of said piston accumulator and on said actuator;
   an accumulator sensor sensing and sending signals representative of pressure levels on said gas side of said accumulator;
   an actuator sensor sensing and sending signals representative of said operating states of said actuator; and
   a control logic connected to and operating said valves based on said signals from said sensors.

2. A system according to claim 1 wherein
   said accumulator piston comprises a stepped piston having partial piston surfaces on said fluid side forming said effective surfaces, said partial piston surfaces being adjacent cylindrical surfaces of said accumulator piston, said accumulator housing having mating surfaces adjacent to said cylindrical surfaces of said accumulator piston, said mating surfaces, said partial piston surfaces and said cylindrical surfaces defining said pressure chambers, said pressure chambers being separate from one another.

3. A system according to claim 2 wherein
   said partial piston surfaces comprises steps axially spaced apart from one another.

4. A system according to claim 3 wherein
   at least one of said pressure chambers is disposed in an interior of said accumulator piston.

5. A system according to claim 3 wherein
   at least two of said pressure chambers are disposed in an interior of said accumulator piston.

6. A system according to claim 2 wherein
   said effective surfaces and said mating surfaces comprises annular surfaces concentrically disposed relative to a longitudinal axis of said piston accumulator.

7. A system according to claim 1 wherein
   said valves are switching valves selectively connecting said pressure chambers not connected to said actuator to a tank.

8. A system according to claim 1 wherein
   said accumulator sensor senses and sends signals of filling pressure on said gas side of said accumulator; and
   said actuator sensor senses and sends signals of system pressure at said actuator.

9. A system according to claim 1 wherein
   said actuator sensor comprises at least one displacement measurer providing signals representative of strokes of said accumulator piston to said control logic.

10. A system according to claim 1 wherein
    said actuator comprises a working cylinder of a hydraulic system for lifting and lowering a load.

11. A system according to claim 1 wherein
    said actuator comprises a hydraulic pump unit of a hydraulic hybrid system.

12. A system for improving energy efficiency in hydraulic systems, the system comprising:
    an actuator operable in a consumer operating state thereof as a hydraulic energy consumer and in a generating operating state thereof as a hydraulic energy generator;
    a discontinuously adjustable hydropneumatic piston accumulator being chargeable in a charging state thereof to store energy from said actuator and being dischargeable in a discharging state thereof to deliver the energy to said actuator, said accumulator including an accumulator housing and an accumulator piston separating a gas side and a fluid side in said accumulator housing and including a plurality of pressure chambers adjacent to effective surfaces of different sizes on said fluid side on said accumulator piston;
    an adjustment arrangement connecting at least a selected one of said pressure chambers or a selected plurality of said pressure chambers to said actuator as a function of the respective pressure levels on said gas side of said piston accumulator and on said actuator; and
    mating surfaces in said accumulator housing defining said pressure chambers with said effective surfaces on said accumulator piston, said mating surfaces and said effective surfaces being disposed in steps axially spaced from one another, at least one of said pressure chambers being disposed in an interior or said accumulator piston.

13. A system according to claim 12 wherein
    at least two of said pressure chambers are disposed in said interior of said accumulator piston.

14. A system according to claim 12 wherein
said effective surfaces and said mating surfaces comprises annular surfaces concentrically disposed relative to a longitudinal axis of said piston accumulator.

15. A system for improving energy efficiency in hydraulic systems, the system comprising:
an actuator operable in a consumer operating state thereof as a hydraulic energy consumer and in a generating operating state thereof as a hydraulic energy generator;
a discontinuously adjustable hydropneumatic piston accumulator being chargeable in a charging state thereof to store energy from said actuator and being dischargeable in a discharging state thereof to deliver the energy to said actuator, said accumulator including an accumulator housing and an accumulator piston separating a gas side and a fluid side in said accumulator housing and including a plurality of pressure chambers adjacent to effective surfaces of different sizes on said fluid side;
an adjustment arrangement connecting at least a selected one of said pressure chambers or a selected plurality of said pressure chambers to said actuator as a function of the respective pressure levels on said gas side of said piston accumulator and on said actuator;
an accumulator sensor sensing and sending signals representative of filling pressure on said gas side of accumulator;
an actuator sensor sensing and sending signals representative of system pressure at said actuator; and
a control logic connected to and operating said adjustment arrangement based on said signals from said sensors.

16. A system for improving energy efficiency in hydraulic systems, the system comprising:
an actuator operable in a consumer operating state thereof as a hydraulic energy consumer and in a generating operating state thereof as a hydraulic energy generator;
a discontinuously adjustable hydropneumatic piston accumulator being chargeable in a charging state thereof to store energy from said actuator and being dischargeable in a discharging state thereof to deliver the energy to said actuator, said accumulator including on an accumulator housing and an accumulator piston separating a gas side and a fluid side in said accumulator housing and including a plurality of pressure chambers adjacent to effective surfaces of different sizes on said fluid side;
an adjustment arrangement connecting at least a selected one of said pressure chambers or a selected plurality of said pressure chambers to said actuator as a function of the respective pressure levels on said gas side of said piston accumulator and on said actuator;
an accumulator sensor sensing and sending signals representative of pressure levels on said gas side of said accumulator;
an actuator displacement measuring sensor sensing and sending signals representative of strokes of said accumulator piston; and
a control logic connected to and operating said adjustment arrangement based on signals from said sensors.

17. A hydropneumatic piston accumulator for a system for improving efficiency in a hydraulic system with the system including an actuator operable in a consuming operating state thereof as a hydraulic energy consumer and in a generating operating state thereof as a hydraulic energy generator and including an adjustment arrangement selectively connecting the actuator and the piston accumulator in the generating and consuming operating states as a function of gas pressure in the piston accumulator, the piston accumulator comprising:
an accumulator housing having a gas side and a fluid side in said accumulator housing and having a plurality of pressure chambers of different sizes on said fluid side, said pressure chambers being chargeable in a charging state thereof to store hydraulic energy and being dischargeable in a discharging state thereof to deliver hydraulic energy;
an accumulator piston being movably guided in said accumulator housing and having discontinuous effective surfaces of different sizes delimiting adjacent ones of said pressure chambers; and
mating surfaces in said accumulator housing defining said pressure chambers with said effective surfaces on said accumulator piston, said mating surfaces and said effective surfaces being disposed in steps axially spaced from one another, at least one of pressure chambers being disposed in an interior of said accumulator piston.

18. A hydropneumatic piston accumulator according to claim 17 wherein
at least two of said pressure chambers are disposed in said interior of said accumulator piston.

19. A hydropneumatic piston accumulator according to claim 17 wherein
said effective surfaces and said mating surfaces comprises annular surfaces concentrically disposed relative to a longitudinal axis of said piston accumulator.

20. A hydropneumatic piston accumulator for a system for improving efficiency in a hydraulic system with the system including an actuator operable in a consuming operating state thereof as a hydraulic energy consumer and in a generating operating state thereof as a hydraulic energy generator and including an adjustment arrangement selectively connecting the actuator and the piston accumulator in the generating and consuming operating states as a function of gas pressure in the piston accumulator, the piston accumulator comprising:
an accumulator housing having a gas side and a fluid side in said accumulator housing and having a plurality of pressure chambers of different sizes on said fluid side, said pressure chambers being chargeable in a charging state thereof to store hydraulic energy and being dischargeable in a discharging state thereof to deliver hydraulic energy;
an accumulator piston being movably guided in said accumulator housing and having discontinuous effective surfaces of different sizes delimiting adjacent ones of said pressure chambers; and
a stepped-shaped bottom part inside said accumulator housing, said bottom part and said accumulator piston having overlapping wall parts.

21. A hydropneumatic piston accumulator according to claim 20 wherein
said accumulator piston and said bottom part comprise inner pistons providing said overlapping wall parts.

22. A hydropneumatic piston accumulator according to claim 21 wherein
one of said pressure chambers is disposed in a longitudinal axis of said accumulator housing and is encompassed by one of said inner pistons of said accumulator piston.

23. A hydropneumatic piston accumulator according to claim 20 wherein
said bottom part comprises a middle extension designed as a displacement piston, said middle extension being retractable during relative movement of said actuator piston and said bottom part toward one another in a stepped-shaped part of said accumulator piston.

24. A hydropneumatic piston accumulator according to claim 23 wherein
said middle extension comprises an inner piston.

25. A hydropneumatic piston accumulator for a system for improving efficiency in a hydraulic system with the system including an actuator operable in a consuming operating state thereof as a hydraulic energy consumer and in a generating operating state thereof as a hydraulic energy generator and including an adjustment arrangement selectively connecting the actuator and the piston accumulator in the generating and consuming operating states as a function of gas pressure in the piston accumulator, the piston accumulator comprising:
an accumulator housing having a gas side and a fluid side in said accumulator housing and having a plurality of pressure chambers of different sizes on said fluid side, said pressure chambers being chargeable in a charging state thereof to store hydraulic energy and being dischargeable in a discharging state thereof to deliver hydraulic energy; and
an accumulator piston being movably guided in said accumulator housing and having discontinuous effective surfaces of different sizes delimiting adjacent ones of said pressure chambers, said piston accumulator having a step-shaped part encompassing one of said pressure chambers in a longitudinal axis of said accumulator housing and delimiting another one of said pressure chambers on an outer circumference thereof with a cylindrical surface and additional parts of said accumulator piston.

26. A hydropneumatic piston accumulator, comprising:
an accumulator housing having a top part and a bottom part at opposite ends of said housing, having a gas side and a fluid side and having a longitudinal axis;
an accumulator piston being longitudinally displaceable in said accumulator housing and separating said gas side from said fluid side;
plural pressure chambers separated from one another in said accumulator housing and disposed concentrically relative to said longitudinal axis, said pressure chambers being delimited by said accumulator piston and said bottom part and being changeable in volume, said bottom part being retractable into said pressure chambers of said accumulator piston and said accumulator piston being retractable into said pressure chambers of said bottom part in a relative movement of said accumulator piston and said bottom part toward one another starting from a maximum position in which at least one of said pressure chambers is maximally filled with a medium in a direction of a minimum position in which at least one of said pressure chambers is comparatively less filled, all of said pressure chambers being separated from one another in a media tight manner within said accumulator housing.

27. A hydropneumatic piston accumulator according to claim 26 wherein
said accumulator piston comprises a step-shaped part encompassing one of said pressure chambers disposed in said longitudinal axis, said step-shaped part delimiting another one of said pressure chambers on an outer circumference of a cylindrical piston surface and additional parts of said accumulator piston.

28. A hydropneumatic piston accumulator according to claim 27 wherein
said step-shaped part comprises an inner piston that encompasses said one of said pressure chambers disposed in said longitudinal axis.

29. A hydropneumatic piston accumulator according to claim 27 wherein
said bottom part comprises a middle extension retractable during the relative movement of said accumulator piston and said bottom part toward one another in the step-shaped part of said accumulator piston.

30. A hydropneumatic piston accumulator according to claim 29 wherein
said middle extension comprises an inner piston designed as a displacement piston; and
said step-shaped part comprises an inner piston.

* * * * *